United States Patent [19]

Lee et al.

[11] Patent Number: 4,568,572
[45] Date of Patent: Feb. 4, 1986

[54] METHOD OF FORMING AN ALUMINA COATED SUBSTRATE

[75] Inventors: Kung Y. Lee; Matthew A. McMahon, both of Wappingers Falls, N.Y.

[73] Assignee: Texaco Inc., White Plains, N.Y.

[21] Appl. No.: 686,054

[22] Filed: Dec. 24, 1984

[51] Int. Cl.$^4$ .............................................. B05D 3/02
[52] U.S. Cl. ........................... 427/376.2; 427/376.4; 427/376.5; 427/419.2
[58] Field of Search ............... 427/376.2, 376.4, 376.5, 427/376.3, 126.4, 419.2, 430.1, 226, 443.2, 404, 405; 428/702; 423/600, 625

[56] References Cited

U.S. PATENT DOCUMENTS

| | | | |
|---|---|---|---|
| 3,231,520 | 1/1966 | Leak et al. | 208/143 |
| 3,240,698 | 3/1966 | Leak et al. | 208/110 |
| 3,410,651 | 11/1968 | Brandenburg et al. | 423/213.2 |
| 3,607,113 | 9/1971 | Featherston | 423/625 |
| 3,765,939 | 10/1973 | Reid | 427/419.2 |
| 3,808,043 | 4/1974 | Hale et al. | 427/419.2 |
| 4,224,288 | 9/1980 | Potter | 423/625 |
| 4,244,986 | 1/1981 | Paruso et al. | 427/376.3 |
| 4,284,675 | 8/1981 | Sakai et al. | 427/419.2 |

*Primary Examiner*—S. L. Childs
*Attorney, Agent, or Firm*—Robert A. Kulason; James F. Young; James J. O'Loughlin

[57] ABSTRACT

A method for coating a substrate with alumina which comprises contacting a substrate with a supersaturated aqueous alkali aluminate solution having an alkali metal hydroxide concentration ranging from 0.75 to 1.5 molar and an aluminum to alkali mole ratio ranging from 0.65 to 0.70 is provided.

8 Claims, No Drawings

METHOD OF FORMING AN ALUMINA COATED SUBSTRATE

BACKGROUND OF THE INVENTION

This invention relates to the preparation of an alumina coated substrate and more particularly, to a method for improving the quality of the alumina coating on a substrate and to improve the efficiency of the coating process.

An alumina coated substrate which can be used for many applications including filtering gases and particles from the exhaust of an internal combustion engine or other source of gas is disclosed in coassigned U.S. Pat. No. 3,231,520. The alumina film is disclosed as being particularly useful as a support for a catalytic material which promotes various reactions, such as those useful in treating exhaust gases in order to clean-up or remove otherwise harmful pollutants.

Coassigned U.S. Pat. Nos. 3,227,659 and 3,410,651 disclose the impregnation of the calcined alumina film with phosphorus and chromium containing materials, respectively. British Pat. No. 1,271,710 discloses that the alumina coated substrate can be used by itself, without any added materials, as a filter to remove lead or lead compounds. The use of the alumina coated substrate to filter and remove carbon particles from diesel engine exhaust gases is disclosed in coassigned U.S. Pat. No. 4,039,294.

In the previously used methods, such as set forth in coassigned U.S. Pat. Nos. 3,231,520 and 3,240,698, a substrate was coated by contacting it with a sodium aluminate solution into which aluminum metal was also charged. The starting sodium aluminate solution was prepared by reacting aluminum metal with a relatively strong aqueous solution of sodium hydroxide or, alternatively, by dissolving alumina in strong aqueous sodium hydroxide. During the coating operation, the substrate along with a quantity of aluminum metal calculated to provide a coating of a desired thickness on the substrate, were both contacted with the sodium aluminate solution. After all of the aluminum metal reacted, the substrate was maintained in contact with the solution for a substantial period of time. This permitted as much of the aluminum hydrate as possible in the solution to precipitate out and coat onto the substrate. Such a process took several hours due to (a) the need to build up a highly supersaturated coating solution by reacting aluminum metal with the solution to initiate the coating, (b) the need to build up the coating solution concentration at a rate which did not overly supersaturate the solution and cause sudden precipitation of alumina hydrate from the solution, and (c) the need to maintain the substrate in the solution an additional length of time, after all of the aluminum metal has reacted, to let the concentration of the coating solution decrease to a level where the alumina hydrate stopped precipitating out and coating the substrate.

SUMMARY OF THE INVENTION

An improved method has now been discovered for coating a substrate with an adherent coating of an alumina hydrate film of good quality. In accordance with this method, a supersaturated aqueous caustic aluminate solution characterized by having an alkali metal hydroxide concentration ranging from 0.75 to 1.5 molar and an aluminum to alkali mole ratio in said solution ranging from 0.65 to 0.70 is contacted with a substrate to be coated generally at a solution temperature ranging from about room temperature to 100° C. For the prescribed caustic aluminate solution, it is essential to maintain an aluminum to alkali mole ratio in the range of 0.65 to 0.70 in the coating solution throughout the coating period. This can be done by introducing or dissolving additional aluminum into the coating solution during the coating process while continuously monitoring the aluminum to alkali concentrations in the solution. When aluminum metal is reacted with the caustic aluminate solution to maintain the prescribed ratio, the reaction is as follows:

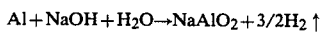

The formation of the alumina hydrate film onto a substrate is as follows:

Generally, on completion of the coating procedure, the coated substrate is removed from the coating solution, washed and calcined to produce an alumina coated substrate.

The prescribed coating solution is a caustic aluminate solution having an alkali metal hydroxide concentration ranging from about 0.75 to 1.5 molar. A preferred alkali metal hydroxide concentration is from about 0.90 to 1.25 molar with the most preferred concentration being about 1 molar.

The aluminum to alkali mole ratio in the coating solution is particularly critical. Aluminum to sodium mole ratios from 0.5 to 0.65 are very ineffective and result in the production of a coated substrate having a very low coating weight ratio relative to the weight of the substrate. On the other hand, aluminum to sodium mole ratios in excess of 0.70 produce coated substrates having a coarse coating of substantially reduced durability. In addition, high aluminum to alkali mole ratios can trigger spontaneous precipitation of alumina from the solution upsetting the coating process. According to the instant process, an effective coating can generally be achieved in from about 3 to 4 hours whereas previous known processes generally require about twice as much time for the same degree of coating.

The preparation of a caustic aqueous solution to which the aluminum metal can be added to form the coating solution of the process of the present invention is disclosed in many patents including U.S. Pat. Nos. 3,227,659, 3,231,520 and 3,240,698 and in many journal articles, including one by Chanakya Misra entitled "Solubility of Aluminum Trihydroxide (Hydrargillite) in Sodium Hydroxide Solutions", published in the May 9, 1970 issue of Chemistry & Industry on pages 619 through 623. The article presents data which disclose the mole ratio of aluminum to sodium necessary to produce a saturated sodium aluminate solution at various temperatures and concentrations of sodium hydroxide. From this, one can readily form a saturated solution of sodium aluminate in an aqueous sodium hydroxide solution at any given temperature. Such solutions, which without modification are incapable of coating a substrate with an alumina film, can be made into a coating solution by further reaction with aluminum metal to produce a supersaturated solution.

The coating solution useful in the present invention for reaction with the aluminum metal can be prepared by reacting metallic aluminum with a strong caustic such as an aqueous solution of an alkali base, preferably an alkali hydroxide. Alternatively, alumina, or an extract from bauxite or bauxite clay can be dissolved in an aqueous solution of an alkali hydroxide, or commercially prepared alkali aluminate can be dissolved in water.

The substrate onto which the alumina film can be deposited can be formed of a metal or a nonmetal, and can include such materials as stainless steel, steel, nickel, iron, iron alloys, chrome-nickel alloys, titanium, sintered metal materials, refractory or ceramic materials (for example, high melting point glass), metal oxides (for example, magnesia and silica), or refractory metal silicates or carbides.

The substrate is not restricted to any particular shape and can have many useful configurations, such as bars, balls, chains, mesh, plates, saddles, sheets, tubes, wire, ribbons, chopped wire, wire mesh, expanded sheets or the like. When the substrate is in a filament form and is enclosed in a casing or tube prior to the deposition of the alumina film on the substrate, the adherent film of alumina forms on both the filaments and on the internal surface of the casing or tube, and bonds the filaments to the interior wall of the casing or tube, holding the coated filaments in place. This is disclosed in coassigned U.S. Pat. No. 3,362,783.

Although the substrate upon which the alumina hydrate is deposited can vary widely, as indicated above, it has been found most convenient to employ knitted steel wire. One suitable form is a cut wire having a nearly circular section and variable thickness and strand lengths. The wire is knitted into a stocking and then rolled into a cylinder of the required thickness and weight.

The alkali portion of the alkali aluminate is preferably sodium, however, the other alkali metals which include potassium, lithium, rubidium, or cesium can also be used. Further, other cations similar in properties to alkali metal cations can also be used to form the aluminate salt, as quaternary bases such as tetramethyl ammonium hydroxide and benzyl-trimethyl ammonium hydroxide.

The exact mechanism by which the firm, tenacious film of alumina forms on the substrate is not precisely known. However, it is known that the deposited film is mainly the trihydrate form of the alumina. This appears to be true whether the initial sodium aluminate solution is produced by reacting aluminum metal with or dissolving alumina into a sodium hydroxide solution.

During the coating process, the coating solution is generally employed at a temperature above normal room temperature. It is desirable to have the coating solution at a temperature of at least 50° C. and preferably from about 80° C. to 100° C.

To be generally useful, the film of alumina formed should not be substantially less than about 0.02 millimeter and preferably not less than 0.05 millimeter. Deposits of alumina of substantially greater thickness are possible, but coatings thicker than about 2 millimeters are generally not advantageous. Preferred films are from about 0.05 millimeter to about 0.3 millimeter in thickness.

After the alumina trihydrate film has been deposited to a suitable thickness on the substrate, the alumina film and the substrate are heated to drive off at least a part of the water of hydration. The dehydration or calcining of the alumina trihydrate film results in an adherent film of alumina being produced with varying degrees of surface porosity. The size of the pores in the alumina film depends on the calcining conditions which include temperature, humidity, and the pressure used during dehydration. Calcining can be accomplished with a temperature as low as 250° C. and can continue to temperatures beyond 1300°C. A useful temperature range is between about 250° C. and about 900° C., with about 250° C. to about 700° C. being preferred. The different heating temperatures produce different forms of alumina having different surface areas and pore sizes. The surface area and pore size desired for the calcined alumina film will depend on the intended use for the alumina film.

The calcined alumina film can be used as a support for catalytic materials and metals. The catalytic material can be added to the alumina by way of known methods, such as by forming an aqueous or non-aqueous solution of the catalytic material, and adding the solution to the alumina film. The solvent is then driven off, leaving the catalytic material on the surface of the alumina film. Useful catalytic materials include elements found in Groups IB, IIB, IVB, VB, VA, VIB, VIIB, and VIII of the Periodic Table of the Elements. Particularly useful catalytic materials include platinum, palladium, iridium, rhodium, phosphorus, and chromium.

The invention will be better understood from the following examples, which further illustrate the present invention, but are not meant to limit the invention in any way.

EXAMPLE I (Comparative Example)

About 17 liters of a caustic aluminate solution was prepared. The concentration of sodium hydroxide in the 17 liters of solution was about 1 molar and the solution had an aluminum to sodium mole ratio of about 0.5. The solution was contained within a stainless steel coating tank and was maintained at a temperature of about 85° C. The solution was contacted with three substrates which comprised glass cylinders about 7.6 centimeters in diameter and about 15 centimeters in height packed with steel wool having a packing density of about 130 grams of steel wool per liter of cylinder volume. The solution was also contacted with about 240 grams of aluminum metal in the form of pellets. After about 3 hours, the substrate and remaining aluminum metal were removed from the coating solution. The aluminum to sodium mole ratio in this Example ranged from 0.5 at the beginning of the run to 0.65 at the end of the run. The results of the run are shown on Table I.

From Table I it can be seen that the coating ratio which is the weight of the alumina deposited per weight of stainless steel is well below one; this is because the mole ratio of aluminum to sodium in the starting solution was too low. The quality of the coating was determined to be about 8.0. Coating quality was based upon visual examination and was rated on a scale of 1 to 10. Values of 9 and 10 are excellent, 7 and 8 are good, 5 and 6 are fair, 3 and 4 are poor, and 1 and 2 are bad. The coating ratios and quality designations of the substrates in the subsequent examples are set forth in Table I.

EXAMPLE II

The coating solution from Example I was immediately contacted with three new substrates similar to that used in Example I, a further quantity of about 240 grams of aluminum metal pellets and the aluminum reaction residue of about 95 grams from Example I. The coating solution was maintained at a temperature of about 85° C. and contacted with the new substrates and aluminum for about 3 hours. The results are set forth in Table I. From Table I it could be seen that the average coating ratio of alumina to stainless steel was as desired, above 1. This is because the run was started with a useful supersaturated coating solution in which the aluminum to sodium mole ratio employed was 0.65 both at the start and at the end of the coating run. The coating quality was high.

EXAMPLES III THROUGH IX

The coating solution from Example II, after the coated substrates were removed, was immediately contacted with three new substrates similar to those in Example I, a further quantity of about 240 grams of aluminum metal in pellet form and the aluminum reaction residue from Example II which was about 50 grams. The coating solution was maintained at a temperature of about 85° C. for about 3 hours. The results of Example III are set forth in Table I. Again, the average coating ratio was over one and the coating quality was good. The coating procedure was repeated with each run being conducted for about 3 hours at about 85° C. The results including the coating weight ratio, coating quality and the calculated aluminum to sodium ratio in solution at the start and at the end of the runs are set forth on Table I. Example VIIA is a second comparative example wherein the aluminum to sodium mole ratio was 0.73 at the start of the run.

strates with an adherent alumina hydrate film having a one to one or higher weight ratio of alumina to stainless steel in a comparatively short coating period. In contrast, comparative Examples I and VIIA are unsatisfactory with a very low coating weight ratio in the case of Example I and an unsatisfactory coarse coating in the case of Example VIIA. The improved alumina-coated products of the invention have the potential of extending the life and effectiveness of catalytic devices used to reduce exhaust emissions produced by gasoline and diesel internal combustion engines.

We claim:

1. A method for coating a substrate with alumina which comprises providing a supersaturated aqueous alkali aluminate solution having an alkali metal hydroxide concentration ranging from 0.75 to 1.5 molar and an aluminum to alkali mole ratio ranging from 0.65 to 0.70, contacting said substrate with said solution to produce an alumina hydrate coated substrate while maintaining said aluminum to alkali mole ratio, separating said coated substrate from said solution and calcining said coated substrate to produce an alumina-coated substrate.

2. A method according to claim 1 in which said alkali metal hydroxide concentration ranges from 0.90 to 1.25 molar.

3. A method according to claim 1 in which said alkali is sodium hydroxide.

TABLE I

| EXAMPLE | SUBSTRATE NO. | COATING WEIGHT RATIO $Al_2O_3$/ SS WOOL | AVERAGE COATING RATIO/ RUN | COATING QUALITY | ALUMINUM REACTION RESIDUE[1] IN GRAMS | $Al/Na^2$ MOLE RATIO IN SOLUTION START OF RUN | $Al/Na^2$ MOLE RATIO IN SOLUTION END OF RUN |
|---|---|---|---|---|---|---|---|
| I | 1 | 0.68 | 0.66 | 8.0 | 95.5 | 0.5 | 0.65 |
| (Comparative) | 2 | 0.64 | | 8.0 | | | |
| | 3 | 0.66 | | 8.0 | | | |
| II | 4 | 1.34 | 1.27 | 7.5 | 50.3 | 0.65 | 0.65 |
| | 5 | 1.19 | | 7.5 | | | |
| | 6 | 1.28 | | 7.5 | | | |
| III | 7 | 1.10 | 1.15 | 7.0 | 57.2 | 0.65 | 0.67 |
| | 8 | 1.16 | | 7.5 | | | |
| | 9 | 1.19 | | 7.5 | | | |
| IV | 10 | 1.05 | 1.12 | 8.0 | 60.7 | 0.67 | 0.67 |
| | 11 | 1.15 | | 7.5 | | | |
| | 12 | 1.15 | | 7.5 | | | |
| V | 13 | 1.21 | 1.18 | 7.0 | 53.7 | 0.67 | 0.68 |
| | 14 | 1.18 | | 7.0 | | | |
| | 15 | 1.14 | | 7.0 | | | |
| VI | 16 | 1.06 | 1.11 | 7.5 | 62.8 | 0.68 | 0.69 |
| | 17 | 1.15 | | 7.5 | | | |
| | 18 | 1.11 | | 7.0 | | | |
| VII | 19 | 1.07 | 1.09 | 7.0 | 36.1 | 0.69 | 0.73 |
| | 20 | 1.10 | | 7.5 | | | |
| | 21 | 1.10 | | 7.0 | | | |
| VIIA | 21a | 1.24 | 1.32 | 5.5[a] | 61.6 | 0.73 | 0.67 |
| (Comparative) | 21b | 1.37 | | 5.5 | | | |
| | 21c | 1.35 | | 5.5 | | | |
| VIII | 22 | 1.08 | 1.11 | 7.0 | 40.5 | 0.67 | 0.69 |
| | 23 | 1.19 | | 7.5 | | | |
| | 24 | 1.07 | | 7.5 | | | |
| IX | 25 | 1.08 | 1.06 | 7.5 | 31.6 | 0.69 | 0.74 |
| | 26 | 1.07 | | 7.5 | | | |
| | 27 | 1.03 | | 7.5 | | | |

[1]composed mainly of alumina hydrate and a small amount of unreacted aluminum.
[2]calculated
[a]white coarse coating on top of filter From the above Examples and the results given in Table I, it can be seen that the process of the invention wherein the alumina hydrate coating procedure is conducted within the prescribed parameters of 0.75 to 1.5 molar alkali metal hydroxide concentration and an aluminum to alkali mole ratio ranging from 0.65 to 0.70 provides surprisingly improved alumina-coated sub- 4. A method according to claim 1 in which said calcining is effected at a temperature ranging from 250° C. to 1300° C.

5. A method according to claim 1 in which said supersaturated aqueous alkali aluminate solution is maintained at a temperature ranging from room temperature to 100° C.

6. A method according to claim 5 in which said alkali aluminate solution is maintained at a temperature ranging from 50° C. to 100° C.

7. A method for coating a substrate with alumina which comprises providing a supersaturated aqueous sodium aluminate solution having a sodium hydroxide concentration ranging from 0.90 to 1.25 molar, and an aluminum to sodium mole ratio ranging from 0.65 to 0.70 mole ratio, maintaining said solution at a temperature ranging from 80° C. to 100° C., contacting said substrate with said solution while maintaining said aluminum to sodium mole ratio to produce an alumina hydrate coated substrate, separating said coated substrate from said solution and calcining said coated substrate at a temperature ranging from 250° C. to 900° C. to produce an alumina-coated substrate.

8. A method according to claim 1 in which a catalytic material is incorporated in said alumina coated substrate.

* * * * *